US012272914B2

(12) United States Patent
Huang et al.

(10) Patent No.: US 12,272,914 B2
(45) Date of Patent: Apr. 8, 2025

(54) CLAMP TERMINAL

(71) Applicants: Wun-Sing Huang, New Taipei (TW); Jhih-Ciang Wang, New Taipei (TW)

(72) Inventors: Wun-Sing Huang, New Taipei (TW); Jhih-Ciang Wang, New Taipei (TW)

(73) Assignee: CVILUX CORPORATION, New Taipei (TW)

( * ) Notice: Subject to any disclaimer, the term of this patent is extended or adjusted under 35 U.S.C. 154(b) by 286 days.

(21) Appl. No.: 18/121,027

(22) Filed: Mar. 14, 2023

(65) Prior Publication Data

US 2024/0313438 A1 Sep. 19, 2024

(30) Foreign Application Priority Data

Feb. 23, 2023 (TW) ................................ 112106807

(51) Int. Cl.
*H01R 4/48* (2006.01)
*H01R 11/11* (2006.01)

(52) U.S. Cl.
CPC ..... *H01R 4/48275* (2023.08); *H01R 4/48365* (2023.08); *H01R 11/11* (2013.01)

(58) Field of Classification Search
CPC .. H01R 4/48275; H01R 11/11; H01R 4/4823; H01R 4/483; H01R 4/4848
USPC .......................................................... 439/441
See application file for complete search history.

(56) References Cited

U.S. PATENT DOCUMENTS

| | | | | |
|---|---|---|---|---|
| 8,721,376 | B1 * | 5/2014 | Bishop | H01R 4/4823 439/441 |
| 9,472,871 | B2 * | 10/2016 | Lin | H01R 4/483 |
| 9,484,639 | B1 * | 11/2016 | Chen | H01R 4/4848 |
| 9,570,817 | B1 * | 2/2017 | Wang | H01R 4/4848 |
| 10,361,494 | B2 * | 7/2019 | Wu | H01R 12/515 |
| 2015/0357728 | A1 * | 12/2015 | Chen | H01R 4/4833 439/725 |
| 2016/0240970 | A1 * | 8/2016 | Wu | H01R 13/635 |
| 2019/0020143 | A1 * | 1/2019 | Jin | H01R 4/4848 |

FOREIGN PATENT DOCUMENTS

DE 102017217139 A1 * 4/2018 ........... H01R 12/515

* cited by examiner

*Primary Examiner* — Tulsidas C Patel
*Assistant Examiner* — Jeffrey Mountain

(57) ABSTRACT

A clamp terminal contains a body which includes a first flexible engagement sheet extending from a predetermined position of a top of the body, a second flexible engagement sheet extending from a predetermined position of a bottom of the body, and multiple removal protrusions extending from a front end of the second flexible engagement sheet. In addition, a mouth is defined between the first flexible engagement sheet and the second flexible engagement sheet. The body further includes a press portion formed on a front end of the top thereof and extending to the first flexible engagement sheet. The press portion has multiple detachable extensions extending from a front end thereof and corresponding to the multiple removal protrusions of the second flexible engagement sheet. Also, at least one core wire is inserted in the body of the clamp terminal.

6 Claims, 9 Drawing Sheets

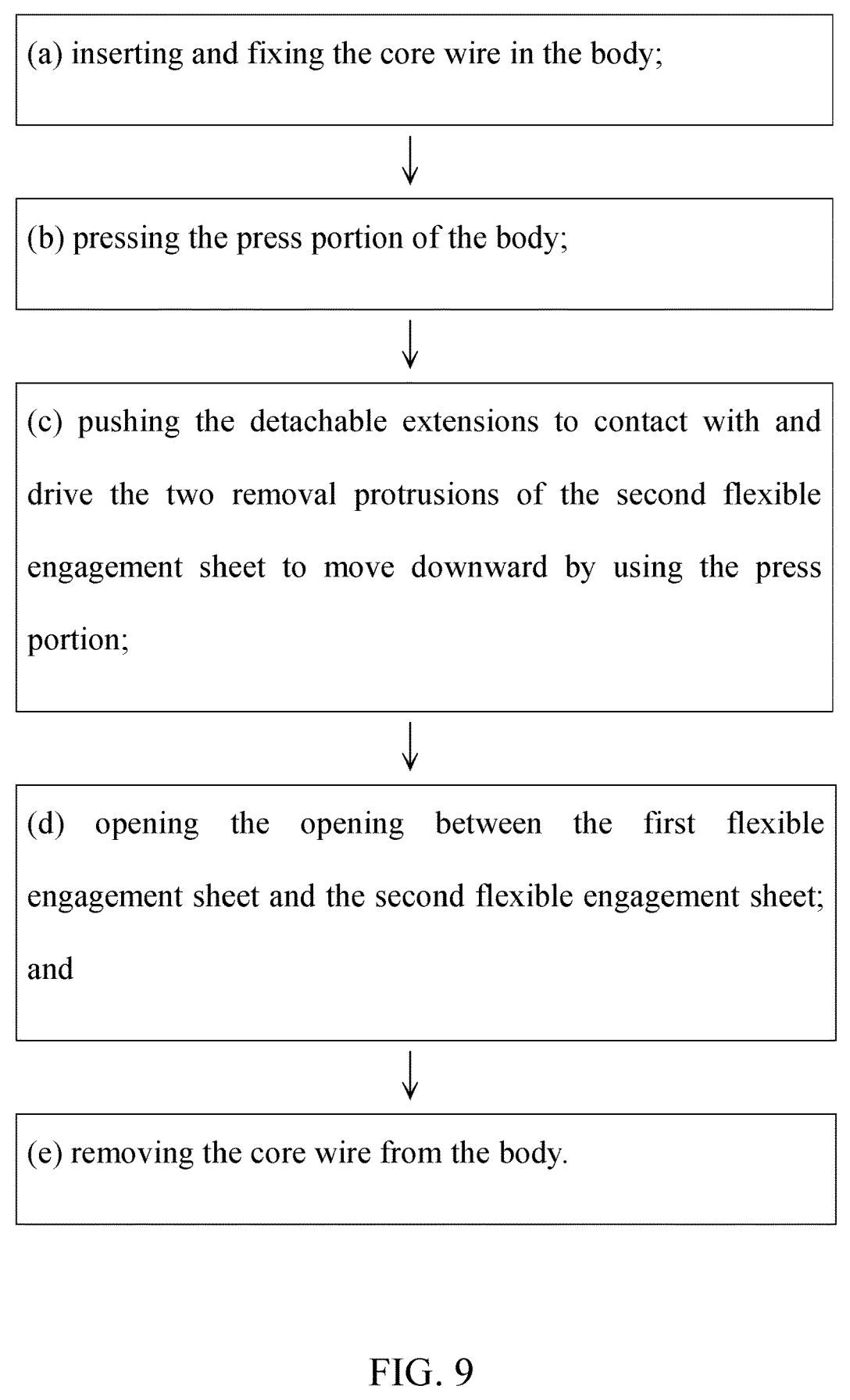

(a) inserting and fixing the core wire in the body;

↓

(b) pressing the press portion of the body;

↓

(c) pushing the detachable extensions to contact with and drive the two removal protrusions of the second flexible engagement sheet to move downward by using the press portion;

↓

(d) opening the opening between the first flexible engagement sheet and the second flexible engagement sheet; and

↓

(e) removing the core wire from the body.

FIG. 9

CLAMP TERMINAL

TECHNICAL FIELD

The present disclosure relates to a clamp terminal which is applied to connect and remove the at least one core wire easily and safely, and the clamp terminal is capable of reducing a poor contact and prolonging a service life.

BACKGROUND

A conventional method of connecting a conventional clamp terminal with at least one core wire contains steps of: providing the clamp terminal which has two flexible engagement sheets extending from a left side and a right side of the clamp terminal and configured to clamp the at least one core wire; as desiring to replace the at least one core wire; and pressing the two flexible engagement sheets to open a mouth to remove the at least one core wire by using a fixture or by manually pressing.

However, since the two flexible engagement sheets extend from the left side and the right side of the clamp terminal, a poor contact, a troublesome connection, and a difficult replacement will occur when multiple clamp terminals are arranged side by side. In addition, it is complicated to remove the at least one core wire by way of the fixture.

The present invention has arisen to mitigate and/or obviate the afore-described disadvantages.

SUMMARY

A primary aspect of the present invention is to provide a clamp terminal which contains the body, and the body includes the first flexible engagement sheet and the second flexible engagement sheet, such that the clamp terminal is applied to connect and remove the at least one core wire easily and safely, and the clamp terminal is capable of reducing a poor contact and prolonging a service life.

To obtain above-mentioned aspect, a clamp terminal provided by the present invention contains: a body including a first flexible engagement sheet extending from a predetermined position of a top of the body, a second flexible engagement sheet extending from a predetermined position of a bottom of the body, and multiple removal protrusions extending from a front end of the second flexible engagement sheet. A mouth is defined between the first flexible engagement sheet and the second flexible engagement sheet. The body further includes a press portion formed on a front end of the top of the body and extending to the first flexible engagement sheet. The press portion has multiple detachable extensions extending from a front end thereof and corresponding to the multiple removal protrusions of the second flexible engagement sheet. At least one core wire is inserted in the body of the clamp terminal. The at least one core wire is inserted in the body and is moved across the mouth between the first flexible engagement sheet and the second flexible engagement sheet so as to be clamped by the first flexible engagement sheet and the second flexible engagement sheet. As desiring to remove the at least one core wire from the clamp terminal, the pressing plane of the press portion of the body is pressed manually so that the two detachable extensions are pushed downward by the press portion to contact with and drive the two removal protrusions of the second flexible engagement sheet to move downward, then the mouth between the first flexible engagement sheet and the second flexible engagement sheet is opened so that the at least one core wire is removed from the mouth.

Preferably, the clamp terminal further contains two auxiliary retainers extending from two predetermined positions of the body.

Preferably, two removal protrusions extend from the front end of the second flexible engagement sheet and are located on a left side and a right side of the front end of the second flexible engagement sheet.

Preferably, the press portion has a pressing plane defined on a predetermined position thereof, and the press portion has two detachable extensions extending from a left side and a right side of the front end thereof.

Preferably, the body further includes at least one orifice defined on a left side and a right side of the front end thereof, and the body is covered by a protective case. The protective case is fixed with the at least one orifice of the body, and the protective case includes a force extension extending from a predetermined position of a top thereof and corresponding to the press portion of the body.

Preferably, the protective case is made of plastic to obtain electric insulation.

Other objects and features will be in part apparent and in part pointed out hereinafter.

BRIEF DESCRIPTION OF THE DRAWINGS

FIG. 9 is a flow chart of a method of operating the clamp terminal of the present invention.

DETAILED DESCRIPTION

Figure 1:
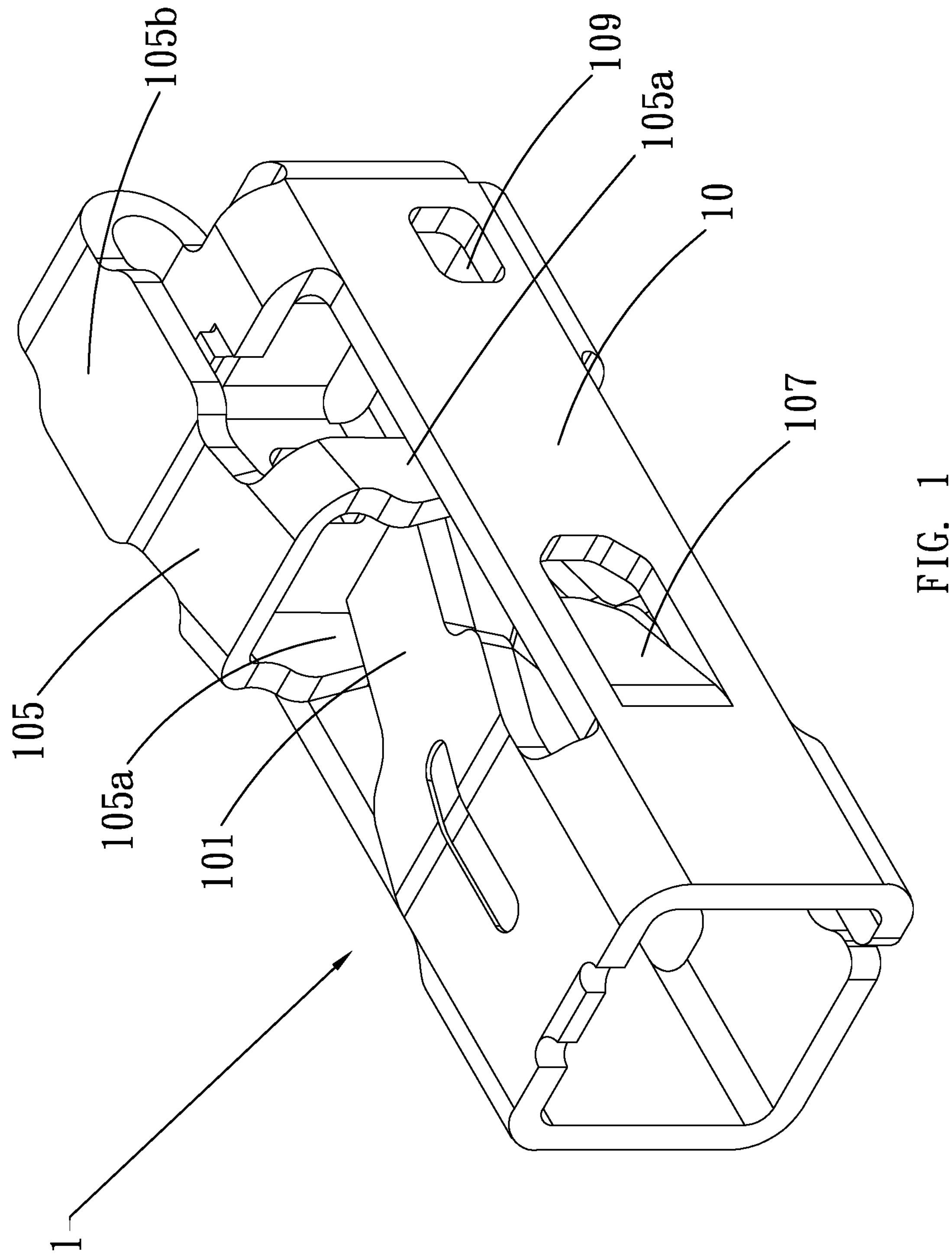
FIG. 1 is a perspective view showing the assembly of a clamp terminal according to a preferred embodiment of the present invention.
Figure 2:
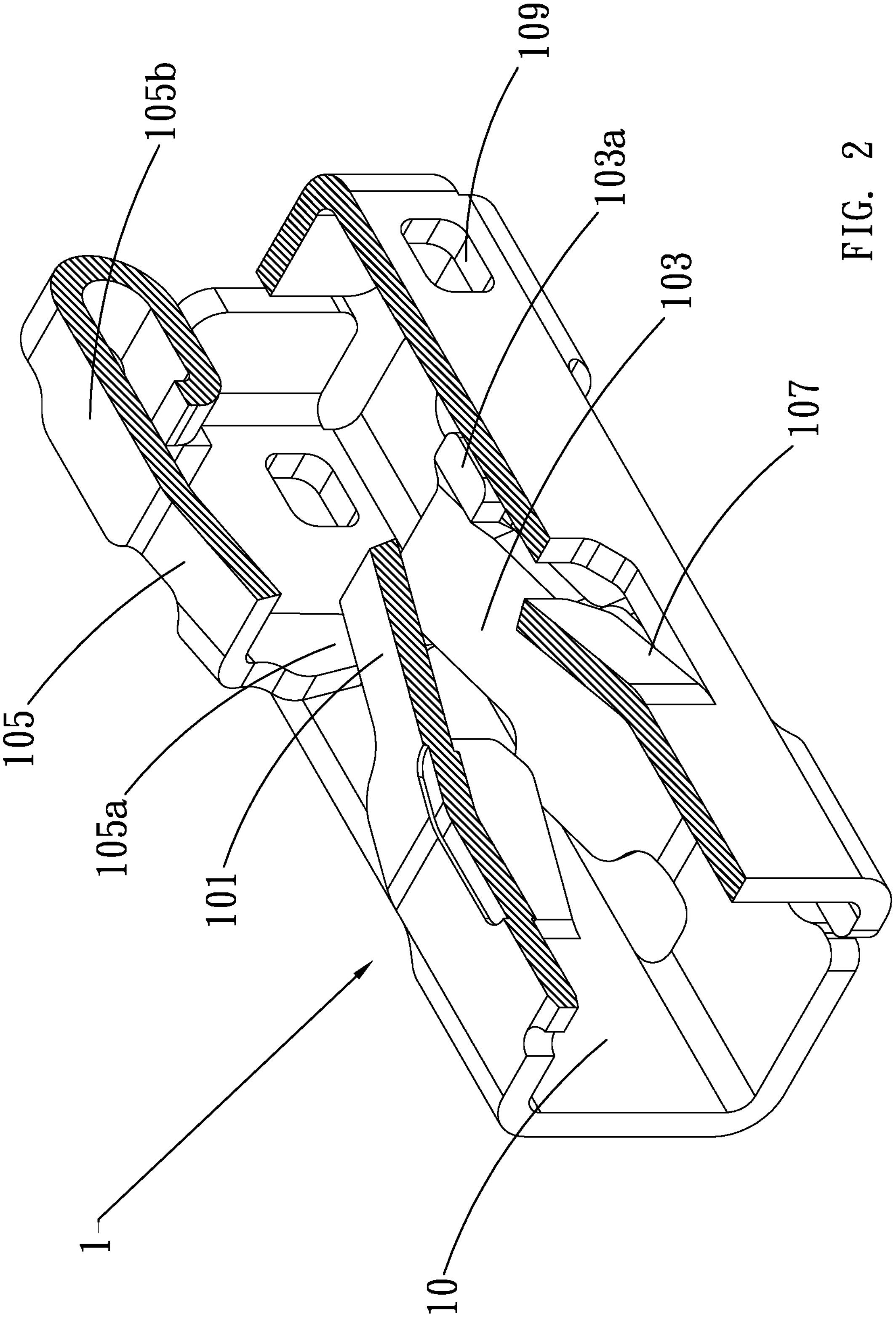
FIG. 2 is a cross-sectional perspective view showing the assembly of a part of the clamp terminal according to the preferred embodiment of the present invention.
Figure 3:
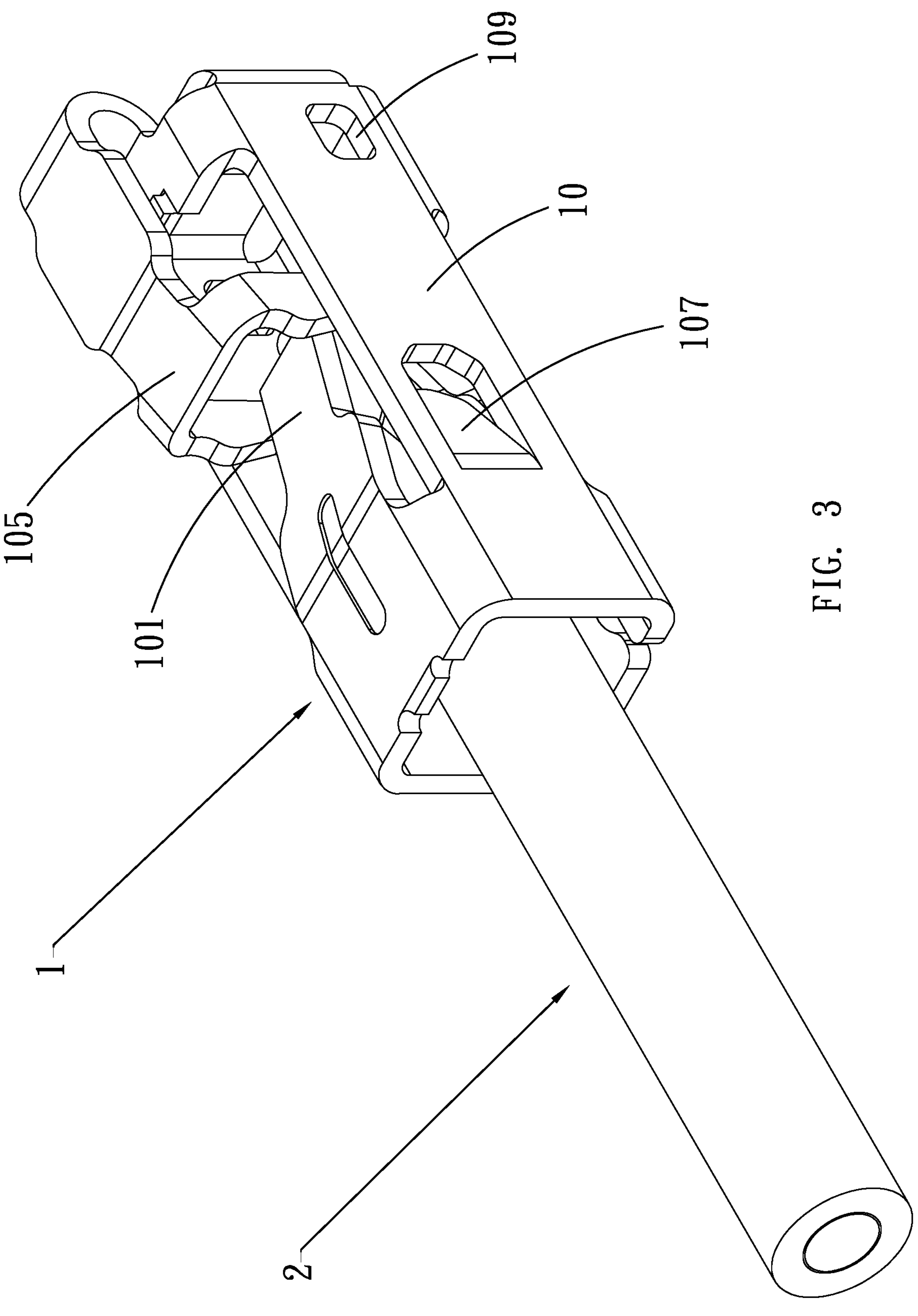
FIG. 3 is a perspective view showing the operation of the clamp terminal according to the preferred embodiment of the present invention.
Figure 4:
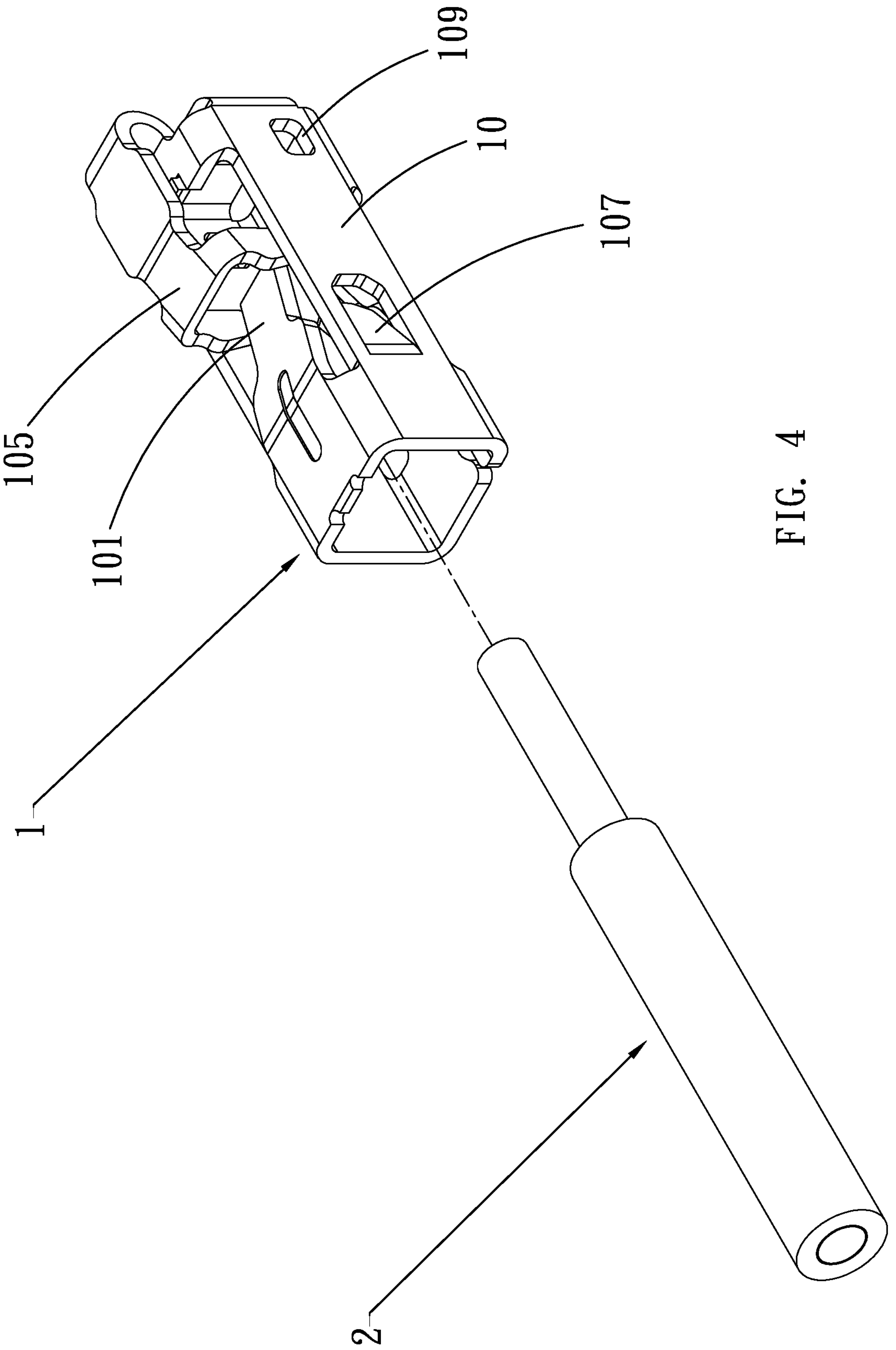
FIG. 4 is another perspective view showing the operation of the clamp terminal according to the preferred embodiment of the present invention.
Figure 5:
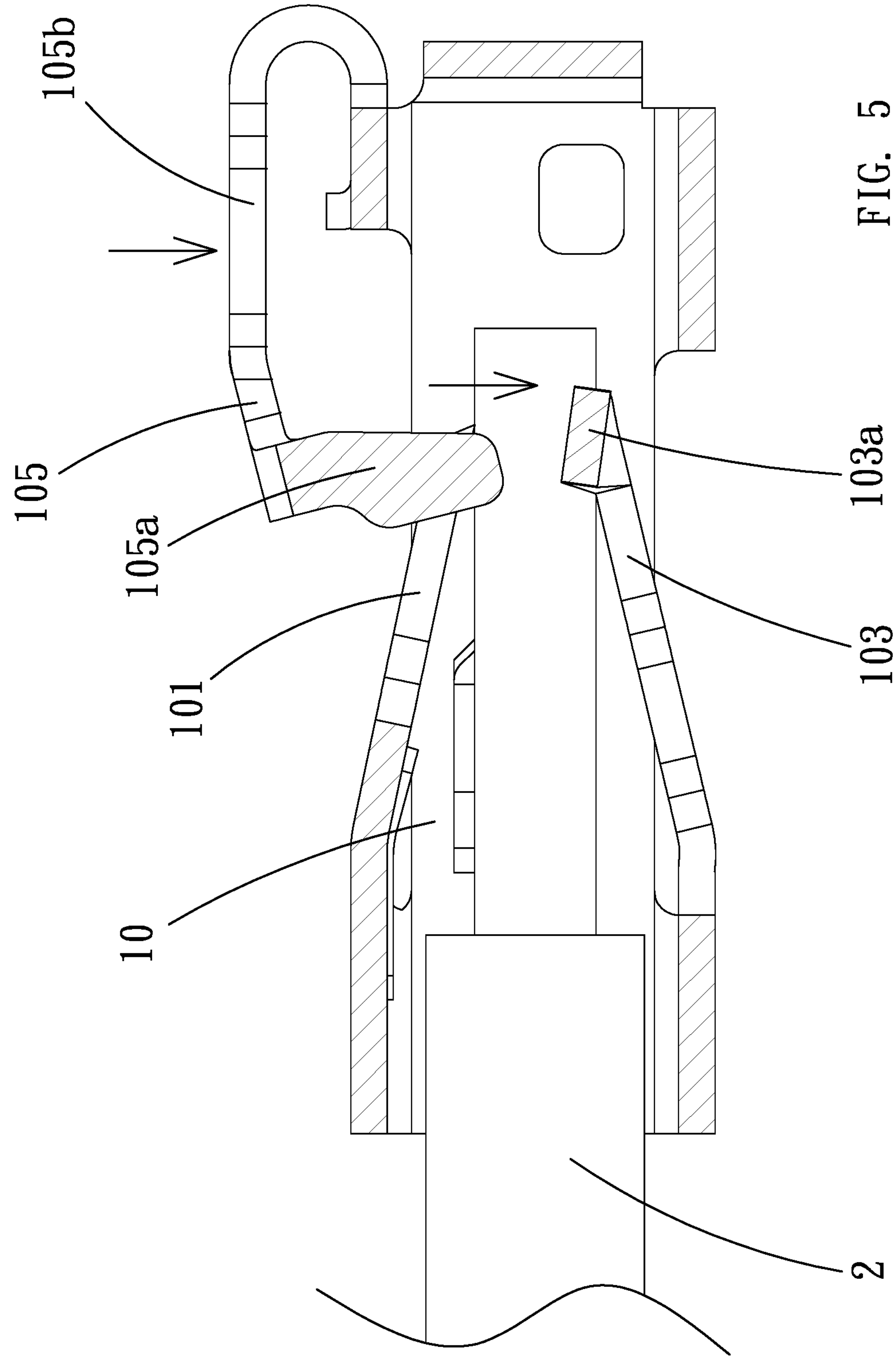
FIG. 5 is a cross sectional view showing the operation of the clamp terminal according to the preferred embodiment of the present invention.
Figure 6:
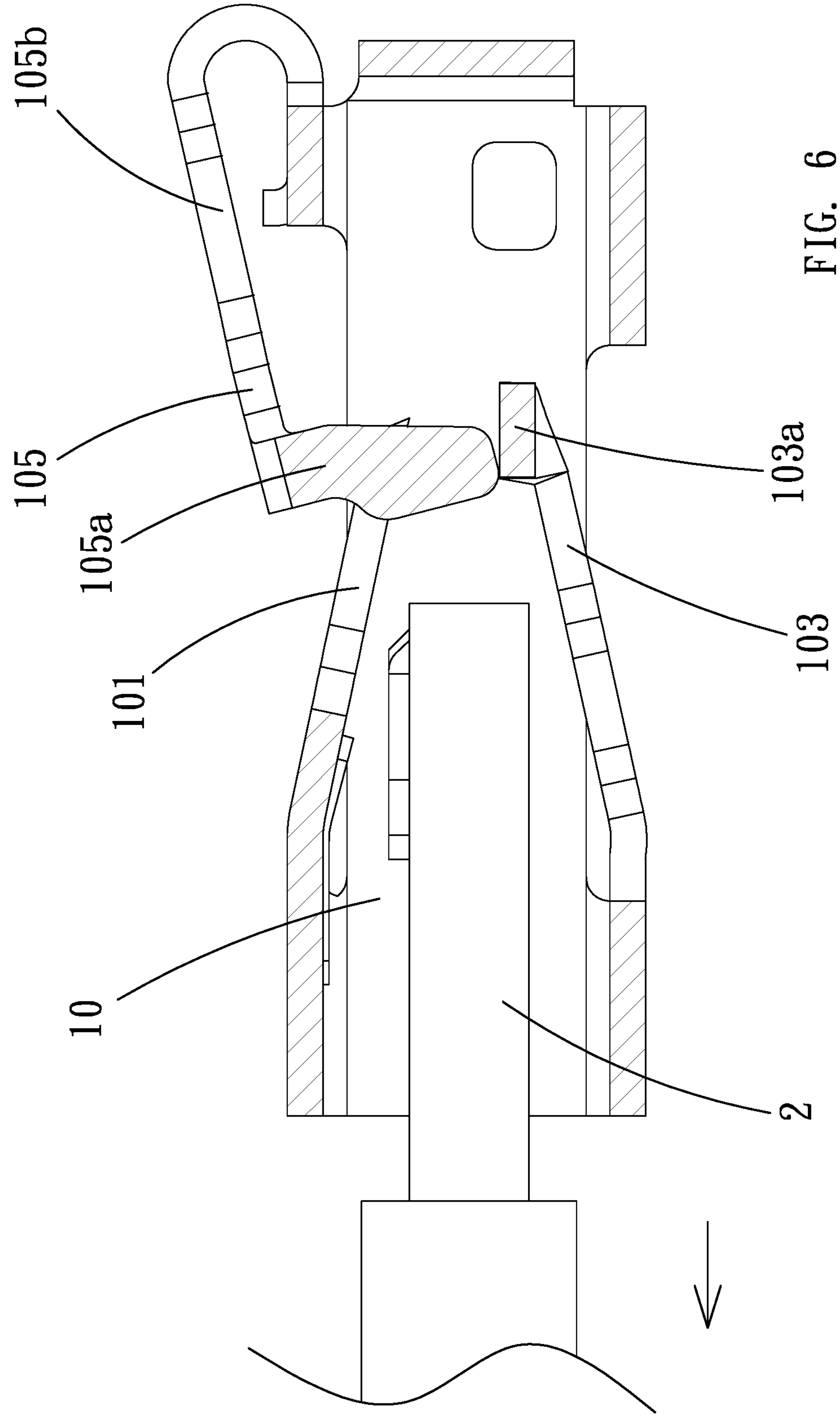
FIG. 6 is another cross sectional view showing the operation of the clamp terminal according to the preferred embodiment of the present invention.
Figure 7:
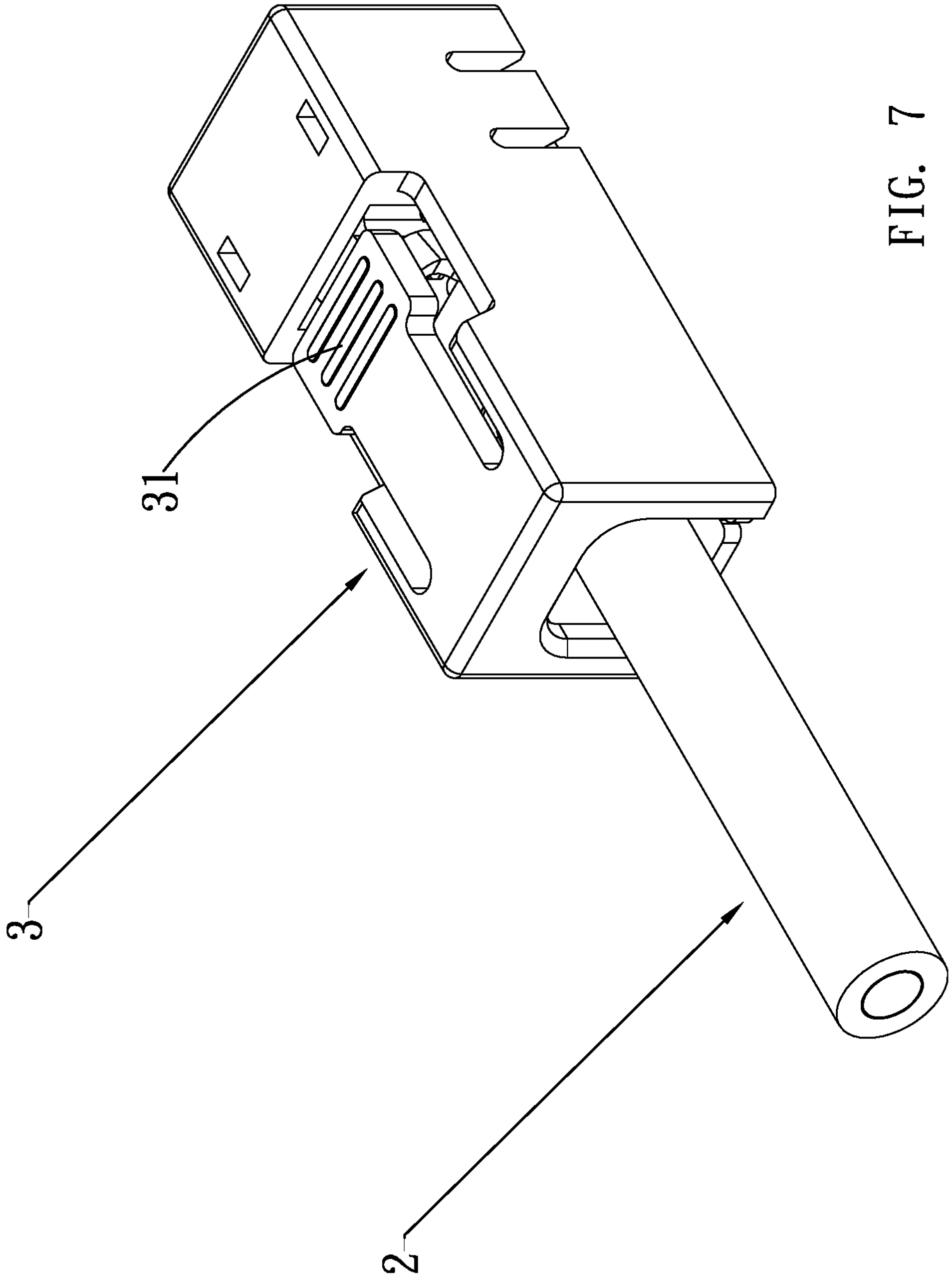
FIG. 7 is a perspective view showing the assembly of a clamp terminal according to another preferred embodiment of the present invention.
Figure 8:
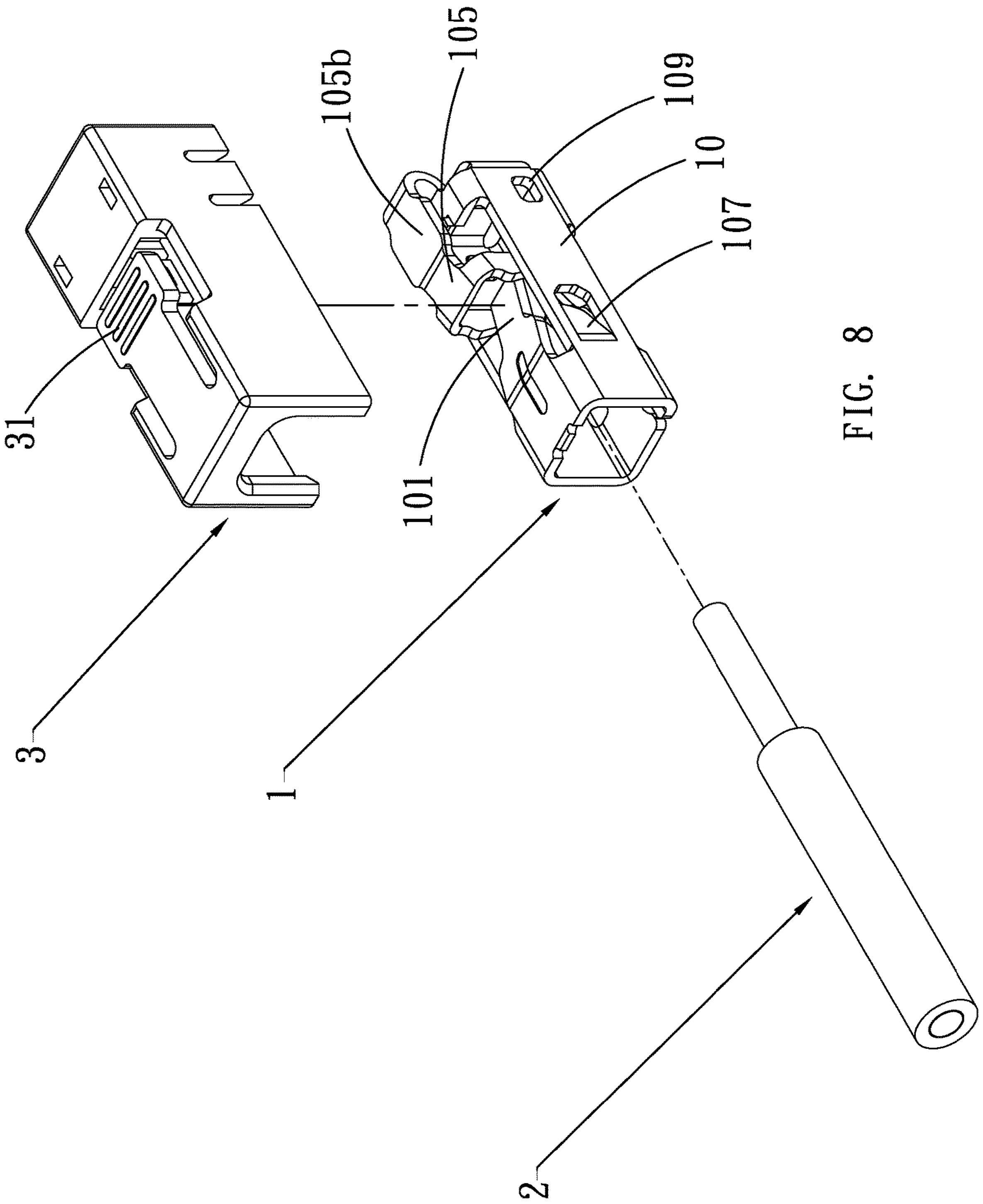
FIG. 8 is a perspective view showing the exploded components of the clamp terminal according to another preferred embodiment of the present invention.

With reference to FIGS. 1-8, a clamp terminal 1 according to a preferred embodiment of the present invention comprises:

a body 10 including a first flexible engagement sheet 101 extending from a predetermined position of a top of the body 10, a second flexible engagement sheet 103 extending from a predetermined position of a bottom of the body 10, and multiple removal protrusions 103*a* extending from a front end of the second flexible engagement sheet 103, wherein a mouth is defined between the first flexible engagement sheet 101 and the second flexible engagement sheet 103; the body 10 further including a press portion 105 formed on a front end of the top of the body 10 and extending to the first flexible engagement sheet 101, wherein the press portion 105 has multiple detachable extensions 105*a* extending from a front end thereof and corresponding to the multiple removal protrusions 103*a* of the second flexible engagement sheet 103; and at least one core wire 2 is inserted in the body 10 of the clamp terminal 1;

two auxiliary retainers 107 extending from two predetermined positions of the body 10; wherein two removal protrusions 103*a* extend from the front end of the second flexible engagement sheet 103 and are located on a left side and a right side of the front end of the second flexible engagement sheet 103, and the press portion 105 has a pressing plane 105*b* defined on a predetermined position thereof, wherein the press portion 105 has two detachable extensions 105*a* extending from a left side and a right side of the front end thereof.

In operation, the at least one core wire 2 is inserted in the body 10 and is moved across the mouth between the first flexible engagement sheet 101 and the second flexible engagement sheet 103 so as to be clamped by the first flexible engagement sheet 101 and the second flexible engagement sheet 103. As desiring to remove the at least one core wire 2 from the clamp terminal 1, the pressing plane 105*b* of the press portion 105 of the body 10 is pressed manually so that the two detachable extensions 105*a* are pushed downward by the press portion 105 to contact with and drive the two removal protrusions 103*a* of the second flexible engagement sheet 103 to move downward, then the mouth between the first flexible engagement sheet 101 and the second flexible engagement sheet 103 is opened so that the at least one core wire 2 is removed from the mouth.

Furthermore, the body 10 further includes at least one orifice 109 defined on a left side and a right side of the front end thereof, and the body 10 is covered by a protective case 3, wherein the protective case 3 is fixed with the at least one orifice 109 of the body 10, and the protective case 3 includes a force extension 31 extending from a predetermined position of a top thereof and corresponding to the press portion 105 of the body 10 so that when removing the at least one core wire, the force extension 31 is pressed to actuate the press portion 105 of the body 10 to remove the at least one core wire. In addition, the protective case 3 is made of plastic to obtain electric insulation.

Referring to FIG. 9, a method of connecting and removing the at least one core wire to and from the clamp terminal comprises steps of:

(a) inserting and fixing the at least one core wire 2 in the body 10;

(b) pressing the press portion 105 of the body 10;

(c) pushing the detachable extensions 105*a* to contact with and drive the two removal protrusions 103*a* of the second flexible engagement sheet 103 to move downward by using the press portion 105;

(d) opening the mouth between the first flexible engagement sheet 101 and the second flexible engagement sheet 103; and (e) removing the at least one core wire 2 from the body 10.

Thereby, the body 10 includes the first flexible engagement sheet 101 and the second flexible engagement sheet 103 which are located on the top and the bottom of the body 10 to clamp the at least one core wire 2, and the two removal protrusions 103*a* of the second flexible engagement sheet 103 and the detachable extensions 105*a* of the press portion 105 are configured to remove the at least one core wire 2. Preferably, the protective case 3 has the electric insulation. The clamp terminal of the present invention is applied to connect and remove the at least one core wire easily and safely. Also, the clamp terminal is capable of reducing a poor contact and prolonging a service life.

Having described the invention in detail, it will be apparent that modifications and variations are possible without departing from the scope of the invention defined in the appended claims.

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A clamp terminal comprising:

a body including a first flexible engagement sheet extending from a predetermined position of a top of the body, a second flexible engagement sheet extending from a predetermined position of a bottom of the body, and multiple removal protrusions extending from a front end of the second flexible engagement sheet, wherein a mouth is defined between the first flexible engagement sheet and the second flexible engagement sheet;

the body further including a press portion formed on a front end of the top of the body and extending to the first flexible engagement sheet, wherein the press portion has multiple detachable extensions extending from a front end thereof and corresponding to the multiple removal protrusions of the second flexible engagement sheet;

at least one core wire being inserted in the body of the clamp terminal;

wherein the at least one core wire is inserted in the body and is moved across the mouth between the first flexible engagement sheet and the second flexible engagement sheet so as to be clamped by the first flexible engagement sheet and the second flexible engagement sheet;

wherein as desiring to remove the at least one core wire from the clamp terminal, the pressing plane of the press portion of the body is pressed manually so that the two detachable extensions are pushed downward by the press portion to contact with and drive the two removal protrusions of the second flexible engagement sheet to move downward, then the mouth between the first flexible engagement sheet and the second flexible engagement sheet is opened so that the at least one core wire is removed from the mouth.

2. The clamp terminal as claimed in claim 1 further comprising two auxiliary retainers extending from two predetermined positions of the body.

3. The clamp terminal as claimed in claim 1, wherein two removal protrusions extend from the front end of the second flexible engagement sheet and are located on a left side and a right side of the front end of the second flexible engagement sheet.

4. The clamp terminal as claimed in claim 1, wherein the press portion has a pressing plane defined on a predetermined position thereof, and the press portion has two detachable extensions extending from a left side and a right side of the front end thereof.

5. The clamp terminal as claimed in claim 1, wherein the body further includes at least one orifice defined on a left side and a right side of the front end thereof, and the body is covered by a protective case, wherein the protective case is fixed with the at least one orifice of the body, and the protective case includes a force extension extending from a predetermined position of a top thereof and corresponding to the press portion of the body.

6. The clamp terminal as claimed in claim 5, wherein the protective case is made of plastic to obtain electric insulation.

* * * * *